United States Patent
Graham et al.

(10) Patent No.: US 10,523,728 B1
(45) Date of Patent: Dec. 31, 2019

(54) INGESTING DATA FROM MANAGED ELEMENTS INTO A DATA ANALYTICS PLATFORM

(71) Applicant: EMC Corporation, Hopkinton, MA (US)

(72) Inventors: Stephen G. Graham, Chapel Hill, NC (US); Matthew L. Troutman, Houston, TX (US); Robert A. Lincourt, Jr., Pawtucket, RI (US); Dominique Prunier, Montreal (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 873 days.

(21) Appl. No.: 13/931,095

(22) Filed: Jun. 28, 2013

(51) Int. Cl.
G06F 15/16 (2006.01)
H04L 29/06 (2006.01)

(52) U.S. Cl.
CPC .................. H04L 65/60 (2013.01)

(58) Field of Classification Search
CPC ........................................... H04L 65/60
USPC .............................................. 709/217
See application file for complete search history.

(56) References Cited

U.S. PATENT DOCUMENTS

| | | | |
|---|---|---|---|
| 8,601,112 B1* | 12/2013 | Nordstrom | G06Q 10/0631 707/600 |
| 2002/0152156 A1* | 10/2002 | Tyson-Quah | G06Q 20/10 705/38 |
| 2003/0200134 A1* | 10/2003 | Leonard | G06Q 30/02 705/7.31 |
| 2005/0172162 A1* | 8/2005 | Takahashi | G06F 11/0709 714/4.4 |
| 2008/0126747 A1* | 5/2008 | Griffen | G06F 9/3879 712/25 |
| 2009/0119172 A1* | 5/2009 | Soloff | G06Q 30/02 705/344 |
| 2009/0300417 A1* | 12/2009 | Bonissone | G05B 23/0254 714/26 |
| 2012/0047113 A1* | 2/2012 | Weinberger | G06F 17/30584 707/693 |
| 2013/0047153 A1* | 2/2013 | Emaru | G06F 3/0607 718/1 |
| 2013/0080373 A1* | 3/2013 | Yeck | G06N 5/02 706/50 |
| 2013/0339371 A1* | 12/2013 | Hayashi | G06F 16/2458 707/743 |
| 2014/0005809 A1* | 1/2014 | Frei | H04L 29/1249 700/90 |
| 2014/0059017 A1* | 2/2014 | Chaney | G06F 7/08 707/692 |

(Continued)

Primary Examiner — Oscar A Louie
Assistant Examiner — Oluwatosin M Gidado
(74) Attorney, Agent, or Firm — Ryan, Mason & Lewis, LLP

(57) ABSTRACT

Example embodiments of the present invention relate to a method, a system, and a computer program product for data analytics. The method includes receiving a plurality of first data streams from respective managed elements in a network and partitioning data of the plurality of first data streams according to an attribute regarding the data into a partitioned second data stream. The partitioned second data stream then may be streamed toward a data analytics platform for consumption by the data analytics platform. In a preferred embodiment, WebSockets are used.

20 Claims, 3 Drawing Sheets

(56) References Cited

U.S. PATENT DOCUMENTS

| | | | |
|---|---|---|---|
| 2014/0059056 A1* | 2/2014 | Chaney | G06F 16/24578 |
| | | | 707/749 |
| 2014/0154973 A1* | 6/2014 | Schoppmeier | H04W 88/06 |
| | | | 455/39 |
| 2016/0127179 A1* | 5/2016 | Frankel | G05B 15/02 |
| | | | 709/220 |
| 2018/0041790 A1* | 2/2018 | Ospalik | H04N 21/2662 |

* cited by examiner

INGESTING DATA FROM MANAGED ELEMENTS INTO A DATA ANALYTICS PLATFORM

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This Application is related to U.S. patent application Ser. No. 13/832,433 entitled "METHOD AND APPARATUS FOR MULTI-DOMAIN WRITING OF APPLICATIONS USING HTML5 POSTMESSAGE" filed on Mar. 15, 2013 the teachings of which applications are hereby incorporated herein by reference in their entirety.

TECHNICAL FIELD

This application relates to data analytics, specifically communication of data for analysis in a computer network.

BACKGROUND

Time series data (e.g., a collection of CPU utilization measurements on a set of servers over a period of several days) is a key data source for IT analytics that helps data center administrators manage the health of their information systems and monitor the performance and availability of the services the information systems provide to an organization. Gathering time series data from its source (e.g., element managers responsible for monitoring individual devices and IT infrastructure components) into an analytics data warehouse is a difficult task.

One approach is to build bespoke (i.e., custom, build-to-order) collectors for each element manager, using the data export protocols exposed by those element managers. This approach can yield good runtime performance, but is expensive to produce and maintain as the number of different time series data sources increases, and is dependent on good performing data export protocols to be available from the data source. Furthermore, many element managers mask the inherent parallelism available, by aggregating data collected from multiple IT infrastructure components (e.g., routers, servers, virtual machines, network nodes, arrays, switches, etc.). This aggregation can prevent collecting information from the element manager in a scale out fashion. This may be referred to as a funneling effect.

SUMMARY

Example embodiments of the present invention relate to a method, a system, and a computer program product for data analytics. The method includes receiving a plurality of first data streams from respective managed elements in a network and partitioning data of the plurality of first data streams according to an attribute regarding the data into a partitioned second data stream. The partitioned second data stream then may be streamed toward a data analytics platform for consumption by the data analytics platform. In a preferred embodiment, WebSockets are used.

BRIEF DESCRIPTION OF THE DRAWINGS

The above and further advantages of the present invention may be better under stood by referring to the following description taken into conjunction with the accompanying drawings in which.

DETAILED DESCRIPTION

A recent trend is to make time series data available through REST APIs. ViPR by EMC Corporation of Hopkinton, Mass., for example, exports time series data through a REST API. Although REST APIs are simple and based on industry standards (e.g., HTTP/S), it is very difficult to get good performance. In particular, it is often critical to get a large volume of metrics data collected over a brief period of time, in support of near-real time performance and availability reporting. This is challenging to do through a REST API because it is extremely difficult to have multiple parallel ingestion processes work against the same REST API (i.e., the request/response paradigm of REST APIs is fundamentally suboptimal with respect to efficiency and latency). It should be understood that, while polling data directly from managed elements is naturally parallelizable, polling data from an element manager, which can be seen as a single entity, is not naturally parallelizable.

For scale-out systems, such as ViPR, importing data to another system (e.g., data analytics platform), such as Watch4Net by EMC Corporation of Hopkinton, Mass., restriction to a single "pipe" (e.g., API) for data transfer causes significant issues with respect to efficiency and latency because of the "funneling effect" (i.e., the workload to gather data from the plurality of managed elements that was done by a plurality of, for example, servers is now handled by a single stream). Therefore, example embodiments of the present invention overcome these and other deficiencies by using the WebSockets protocol to achieve a performant, real time, and parallelizable mechanism to ingest data. As understood in the art, Web Sockets is an HTML5 standard developed as a protocol upgrade over HTTP/S that provides a very efficient, low latency mechanism to communicate data bi-directionally between clients and servers and, like HTTP/S, leverages existing TCP/IP networking infrastructure and web application layer devices and software.

Example embodiments of the present invention leverage both the asynchronous nature of WebSockets in combination with REST. The asynchronous nature of WebSockets which allows data to be pushed from the data source, instead of polling for data, significantly reduces latency as compared to HTTP/S polling. Additionally, the use of REST allows the data source to provide data streams specific to a device or a set of devices, thereby allowing increased parallelism in the ingestion process.

Figure 1:
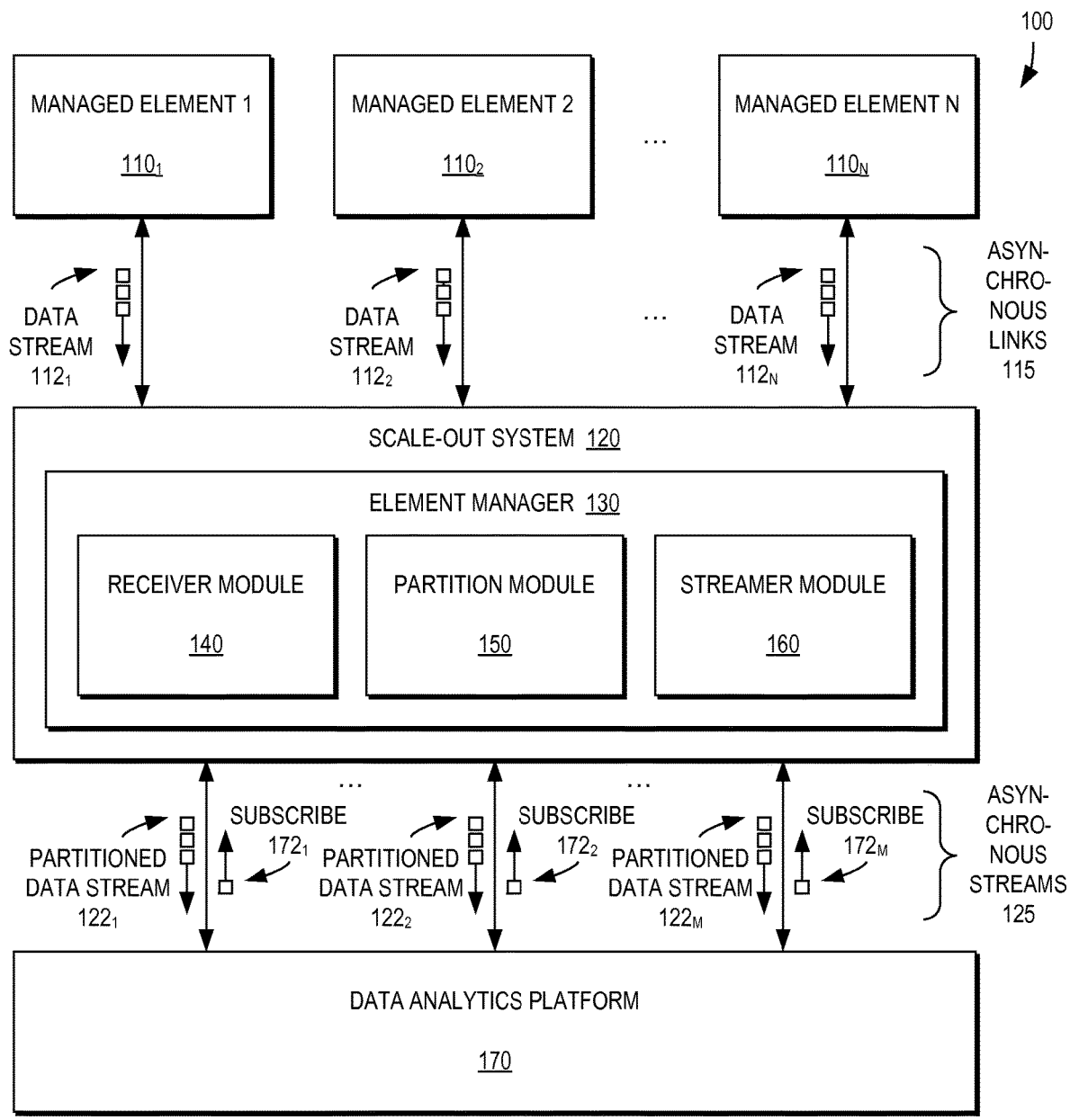
FIG. 1 is a block diagram of a network including an element manager for ingesting data from a plurality of managed elements into a data analytics platform according to an example embodiment of the present invention.

FIG. 1 is a block diagram of a network 100 including an element manager 130 (as part of a scale-out system 120) for ingesting data from a plurality of managed elements (e.g., managed element 1 $110_1$-managed element N $110_N$) (generally 110) into a data analytics platform 170 according to an example embodiment of the present invention. It should be understood that there may be thousands of managed elements 110 in the network 100 and that each managed element 110 uses an asynchronous link 115 (e.g., WebSocket) to push data to the element manager 130. FIG. 1 may be studied in conjunction with FIG. 2 which is a flow diagram illustrating a method according to an example embodiment of the present invention.

Figure 2:
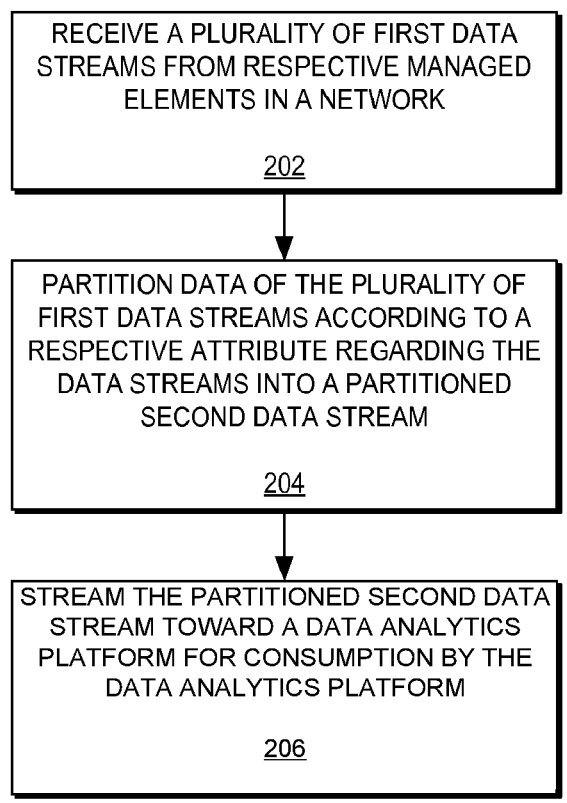
FIG. 2 is a flow diagram illustrating a method according to an example embodiment of the present invention.

As illustrated in FIGS. 1 and 2, the element manager 130 may include a receiver module 140, a partition module 150, and a stream module 160. The receiver module 140 may receive a plurality of first data streams $112_1$-$112_N$ (generally 112) from respective managed elements $110_1$-$110_N$ in the network 100 (202). As will be described in greater detail below, the partition module 150 may partition data of the plurality of first data streams 110 according to an attribute regarding the data streams 112 into a partitioned second data stream $122_1$-$122_M$ (generally 122) (204). The streamer module 160 then may stream the partitioned second data stream 122 toward a data analytics platform 170 for consumption by the data analytics platform 170 (206).

It should be understood that the receiver module 140 receives the plurality of first data streams 112 from respective managed elements 110 in the network 100 over respective asynchronous links 115 and, similarly, the streamer module 160 streams the partitioned second data streams 122 toward the data analytics platform 170 over respective asynchronous streams 125 for consumption by the data analytics platform 170. In a preferred embodiment, these links 115 and streams 125 are WebSockets.

To partition the data of the plurality of first data streams 110, the partition module 150 may determine the attribute regarding the data streams 122 according to which the plurality of first data streams 112 are to be partitioned and then filter the data of the plurality of first data streams 112 according to the determined attribute. To determine which attributes over which the partition module 150 should partition the data of the plurality of first data streams 112, the receiver module may receive a subscription request $172_1$-$172_M$ (generally 172) from the data analytics platform 170 identifying the attribute for filtering the data of the plurality of first data streams 112. Therefore, example embodiments of the present invention partition the data of the plurality of first data streams 112 based on a subscription 172 to the partition instead of performing a bulk copy (e.g., SQL ETL).

The partition module 150, optionally in conjunction with the streamer module 160, then may generate the partitioned second data stream 122 for streaming toward the data analytics platform 170 according to the filtered data of the plurality of first data streams 112 filtered by the partition module 150, such as by selecting (i.e., allocating) for inclusion in the partitioned second data stream 122 only the selected data of the plurality of first data streams 112 having the identified attribute as a data attribute.

It should be understood that the partition module 150 may partition the data of the plurality of first data streams 110 according to one or more attributes (e.g., individual plural attributes or a hierarchy of attributes) regarding the data streams 112 into one or more respective partitioned second data streams 122 for parallel streaming toward the data analytics platform 170.

Additionally, the one or more attributes regarding the data streams 112 may be regarding the data, itself, of the data streams 112 or regarding the managed element 110 sending the data streams 112. For example, the one or more attributes regarding the data streams 112 may be regarding the content of the data or attributes of the managed element 110.

Further, although N first data streams 112 and M partitioned second data streams 122 are shown in FIG. 2, the ratio of M:N is not limited to a 1:1 ratio and may be any ratio of N first data streams 112 to M partitioned second data streams 122 such that the data of the plurality of first data streams 112 received by the receiver module 140 is parallelized over the plurality of M partitioned second data streams 122 streamed from the streamer module 160 toward the data analytics platform 170 for consumption by the data analytics platform. It should be understood that the data analytics platform 170 may direct how many partitioned data streams 122 it receives from the streamer module 160 based on resources available at the data analytics platform 170. Therefore, example embodiments of the present invention are able to distribute the data of the plurality of first data streams 112 without a restriction of a single API and without exposing the underlying architecture of the scale out system 120.

Figure 3:
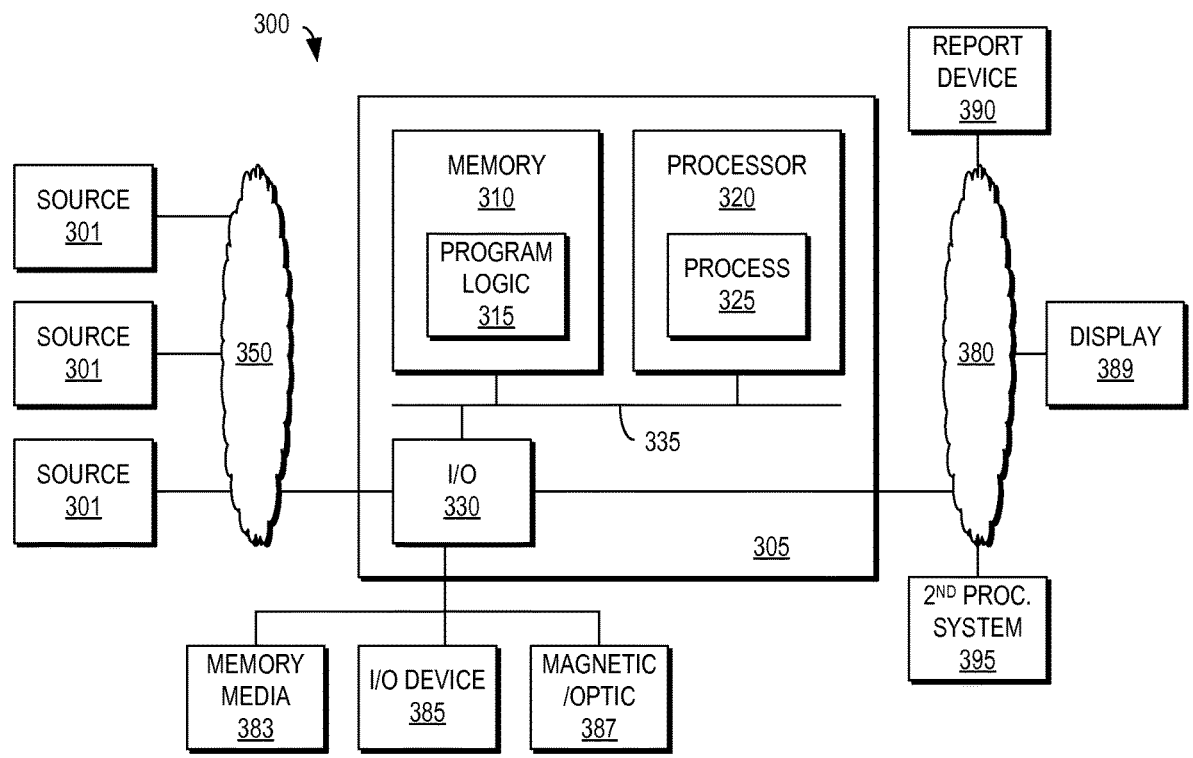
FIG. 3 is a block diagram illustrating an apparatus according to an example embodiment of the present invention.

FIG. 3 is a block diagram of an example embodiment apparatus 305 according to the present invention. The apparatus 305 may be part of a system 300 and includes memory 310 storing program logic 315, a processor 320 for executing a process 325, and a communications I/O interface 330, connected via a bus 335.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 3, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 4:
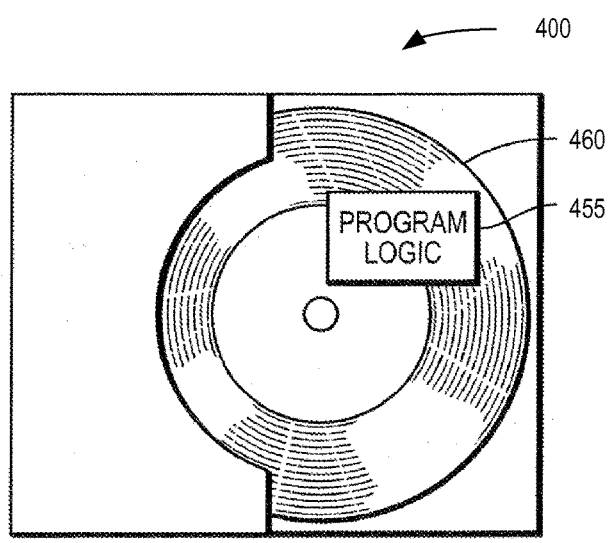
FIG. 4 is an illustration of an example embodiment of the present invention embodied as a computer program product.

FIG. 4 shows program logic 455 embodied on a computer-readable medium 460 as shown, and wherein the logic 455 is encoded in computer-executable code configured for carrying out the methods of this invention, thereby forming a computer program product 400.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method for ingesting data into a data analytics platform comprising:
   receiving, in parallel over a plurality of asynchronous links, a plurality of first data streams from respective managed elements in a network;
   receiving, from the data analytics platform, a subscription request identifying one or more attributes regarding the plurality of first data streams;
   partitioning data of the plurality of first data streams according to the one or more attributes regarding the plurality of first data streams into two or more partitioned second data streams, the partitioning comprising, for a given one of the two or more partitioned second data streams:
      determining at least one of the one or more attributes;
      filtering the data of the plurality of first data streams according to the determined at least one attribute; and
      generating the given partitioned second data stream according to the filtered data of the plurality of first data streams;
   receiving, from the data analytics platform, an indication of a designated number of different partitioned second data streams to stream based on resources available at the data analytics platform, the designated number of different partitioned data streams being different than a number of the plurality of first data streams received over the plurality of asynchronous links; and
   streaming, in parallel over two or more asynchronous streams, the designated number of different partitioned second data streams toward the data analytics platform for consumption by the data analytics platform;
   wherein the data analytics platform is configured to perform IT analytics on the two or more partitioned second data streams; and
   wherein the given partitioned second data stream includes time series data related to one or more of the managed elements.

2. The method of claim 1:
   wherein receiving the plurality of first data streams from respective managed elements in the network comprises receiving the plurality of first data streams from respective managed elements in the network over respective first Web Sockets; and
   wherein streaming the designated number of different partitioned second data streams toward the data analytics platform for consumption by the data analytics platform comprises streaming the designated number of different partitioned second data streams toward the data analytics platform for consumption by the data analytics platform over respective second Web Sockets.

3. The method of claim 1 wherein the at least one determined attribute comprises a hierarchy of attributes regarding the data according to which the plurality of first data streams are to be partitioned.

4. The method of claim 1 wherein generating the given partitioned second data stream comprises allocating selected data of the plurality of first data streams having the determined at least one attribute to the given partitioned second data stream.

5. The method of claim 4 wherein filtering the data of the plurality of first data streams according to the one or more attributes comprises selecting data of the plurality of first data streams having the determined at least one attribute as a data attribute for inclusion in the given partitioned second data stream.

6. The method of claim 1 wherein the one or more attributes comprise attributes regarding at least one of:
   content of the data in the plurality of first data streams; and
   attributes of selected ones of the managed elements in the network.

7. The method of claim 1 wherein at least one of the plurality of asynchronous links comprises a Websockets link configured utilizing representational state transfer (REST) to push data from a specified set of one or more devices managed by a respective one of the managed elements.

8. The method of claim 1 wherein the managed elements in the network comprise a scale out architecture, and wherein partitioning the data of the plurality of first data streams into the two or more partitioned second data streams conceals the scale out architecture of the managed elements.

9. The method of claim 1 wherein streaming the designated number of different partitioned second data streams toward the data analytics platform comprises utilizing two or more different application programming interfaces (APIs) for data transfer to the data analytics platform.

10. A system for ingesting data into a data analytics platform comprising:
    one or more managed elements in a network; and
    a management system coupled to the one or more managed elements and the data analytics platform, the management system comprising one or more processors, the one or more processors configured to:
       receive, in parallel over a plurality of asynchronous links, a plurality of first data streams from respective ones of the managed elements;
       receive, from the data analytics platform, a subscription request identifying one or more attributes regarding the plurality of first data streams;
       partition data of the plurality of first data streams according to the one or more attributes regarding the plurality of first data streams into two or more partitioned second data streams, the partitioning comprising, for a given one of the two or more partitioned second data streams:
          determining at least one of the one or more attributes;
          filtering the data of the plurality of first data streams according to the determined at least one attribute; and
          generating the given partitioned second data stream according to the filtered data of the plurality of first data streams;
       receive, from the data analytics platform, an indication of a designated number of different partitioned second data streams to stream based on resources available at the data analytics platform, the designated number of different partitioned data streams being different than a number of the plurality of first data streams received over the plurality of asynchronous links; and
       stream, in parallel over two or more asynchronous streams, the designated number of different partitioned second data streams toward the data analytics platform for consumption by the data analytics platform;
    wherein the data analytics platform is configured to perform IT analytics on the two or more partitioned second data streams; and
    wherein the given partitioned second data stream includes time series data related to one or more of the managed elements.

11. The system of claim 10:
wherein the one or more processors are further configured to receive the plurality of first data streams from respective managed elements in the network over respective first Web Sockets; and
wherein the one or more processors are further configured to stream the designated number of different partitioned second data streams toward the data analytics platform for consumption by the data analytics platform over respective second WebSockets.

12. The system of claim 10 wherein the one or more processors are further configured to allocate selected data of the plurality of first data streams having the determined at least one attribute to the given partitioned second data stream.

13. The system of claim 12 wherein the one or more processors are further configured to select data of the plurality of first data streams having the determined at least one attribute as a data attribute for inclusion in the given partitioned second data stream.

14. The system of claim 10 wherein the one or more attributes comprise attributes regarding at least one of:
content of the data in the plurality of first data streams; and
attributes of selected ones of the managed elements in the network.

15. A computer program product including a non-transitory computer readable storage medium storing computer program code that when executed by a processor of a computer causes the computer to ingest data into a data analytics platform by:
receiving, in parallel over a plurality of asynchronous links, a plurality of first data streams from respective managed elements in a network;
receiving, from the data analytics platform, a subscription request identifying one or more attributes regarding the plurality of first data streams;
partitioning data of the plurality of first data streams according to one or more attributes regarding the plurality of first data streams into two or more partitioned second data streams, the partitioning comprising, for a given one of the two or more partitioned data streams:
determining at least one of the one or more attributes;
filtering the data of the plurality of first data streams according to the determined at least one attribute; and
generating the given partitioned second data stream according to the filtered data of the plurality of first data streams;
receiving, from the data analytics platform, an indication of a designated number of different partitioned second data streams to stream based on resources available at the data analytics platform, the designated number of different partitioned data streams being different than a number of the plurality of first data streams received over the plurality of asynchronous links; and
streaming, in parallel over two or more asynchronous streams, the designated number of different partitioned second data streams toward the data analytics platform for consumption by the data analytics platform;
wherein the data analytics platform is configured to perform IT analytics on the two or more partitioned second data streams; and
wherein the given partitioned second data stream includes time series data related to one or more of the managed elements.

16. The computer program product of claim 15 wherein the non-transitory computer readable storage medium stores computer program code that when executed by the processor of the computer further causes the computer to:
receive the plurality of first data streams from respective managed elements in the network over respective first Web Sockets; and
stream the designated number of different partitioned second data streams toward the data analytics platform for consumption by the data analytics platform over respective second Web Sockets.

17. The computer program product of claim 15 wherein the at least one determined attribute comprises a hierarchy of attributes regarding the data according to which the plurality of first data streams are to be partitioned.

18. The computer program product of claim 15 wherein the non-transitory computer readable storage medium stores computer program code that when executed by the processor of the computer further causes the computer to allocate selected data of the plurality of first data streams having the determined at least one attribute to the given partitioned second data stream.

19. The computer program product of claim 18 wherein the non-transitory computer readable storage medium stores computer program code that when executed by the processor of the computer further causes the computer to select data of the plurality of first data streams having the determined at least one attribute as a data attribute for inclusion in the given partitioned second data stream.

20. The computer program product of claim 15 wherein the one or more attributes comprise attributes regarding at least one of:
content of the data in the plurality of first data streams; and
attributes of selected ones of the managed elements in the network.

* * * * *